United States Patent
Yang et al.

(10) Patent No.: US 11,985,677 B2
(45) Date of Patent: May 14, 2024

(54) METHOD AND DEVICE FOR TRANSMITTING/RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 521 days.

(21) Appl. No.: 17/267,722

(22) PCT Filed: Aug. 12, 2019

(86) PCT No.: PCT/KR2019/010196
§ 371 (c)(1),
(2) Date: Feb. 10, 2021

(87) PCT Pub. No.: WO2020/032761
PCT Pub. Date: Feb. 13, 2020

(65) Prior Publication Data
US 2021/0329684 A1     Oct. 21, 2021

(30) Foreign Application Priority Data

Aug. 10, 2018   (KR) ................ 10-2018-0094056
May 15, 2019   (KR) ................ 10-2019-0057227

(51) Int. Cl.
*H04W 72/23*     (2023.01)
*H04L 1/1607*     (2023.01)
(Continued)

(52) U.S. Cl.
CPC .......... *H04W 72/23* (2023.01); *H04L 1/1664* (2013.01); *H04L 1/1685* (2013.01);
(Continued)

(58) Field of Classification Search
CPC ............ H04W 74/0833; H04W 72/04; H04W 72/563; H04W 74/0891; H04W 56/001;
(Continued)

(56) References Cited

U.S. PATENT DOCUMENTS

2015/0131494 A1    5/2015   He et al.
2019/0174518 A1*   6/2019   Jiang ................ H04W 72/1268
2019/0387410 A1*   12/2019   Bialer ................ H04W 16/02

FOREIGN PATENT DOCUMENTS

KR    1020140148281     12/2014
KR    1020160135013     11/2016
(Continued)

OTHER PUBLICATIONS

PCT International Search Report and Written Opinion in International Appln. No. PCT/KR2019/010196, dated Nov. 21, 2019, 19 pages (with English translation).

*Primary Examiner* — Omar J Ghowrwal
(74) *Attorney, Agent, or Firm* — Fish & Richardson P.C.

(57) ABSTRACT

A method and a device for transmitting/receiving a signal in a wireless communication system, according to one embodiment of the present invention, transmit ACK/NACK information differently depending on whether UL grant DCI includes PUSCH scheduling or not.

11 Claims, 12 Drawing Sheets

(51) Int. Cl.
*H04L 1/1829* (2023.01)
*H04L 1/1867* (2023.01)
*H04L 5/00* (2006.01)
*H04W 72/1268* (2023.01)

(52) U.S. Cl.
CPC .......... *H04L 1/1854* (2013.01); *H04L 1/1896* (2013.01); *H04L 5/0044* (2013.01); *H04L 5/0055* (2013.01); *H04L 5/0094* (2013.01); *H04W 72/1268* (2013.01); *H04L 1/1861* (2013.01)

(58) Field of Classification Search
CPC ......... H04W 72/0446; H04W 72/0453; H04W 74/002; H04W 72/23; H04W 72/1268; H04B 7/0695; H04L 5/0053; H04L 5/0094; H04L 1/1896; H04L 1/1861; H04L 1/1664; H04L 1/1685; H04L 1/1854; H04L 5/0044; H04L 5/0055
See application file for complete search history.

(56) References Cited

FOREIGN PATENT DOCUMENTS

| | | | |
|---|---|---|---|
| KR | 1020170093068 | 8/2017 | |
| KR | 1020170140404 | 12/2017 | |
| WO | WO-2019193427 A1 * | 10/2019 | .......... H04W 56/001 |

\* cited by examiner (a) Carrier aggregation between L-band and U-band (b) Standalone U-band(s)

METHOD AND DEVICE FOR TRANSMITTING/RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2019/010196, filed on Aug. 12, 2019, which claims the benefit of Korean Application No. 10-2019-0057227, filed on May 15, 2019, and Korean Application No. 10-2018-0094056, filed on Aug. 10, 2018. The disclosures of the prior applications are incorporated by reference in their entirety.

TECHNICAL FIELD

The present disclosure relates to a method and apparatus used in a wireless communication system, and more particularly, to a method and apparatus for transmitting and receiving a control signal and a data signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

Provided are a method and apparatus for transmitting and receiving signals, in which a hybrid automatic repeat request (HARQ)-acknowledgement (ACK) is efficiently transmitted in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for receiving a signal in a wireless communication system.

In an aspect of the present disclosure, a method of transmitting and receiving a signal by a communication device in a wireless communication system includes receiving downlink (DL) data based on DL grant downlink control information (DCI), receiving uplink (UL) grant DCI indicating transmission of acknowledgment/negative acknowledgment (ACK/NACK) information for the DL data and a physical uplink control channel (PUCCH) resource to be used for the transmission of the ACK/ACNK information, and transmitting the ACK/NACK information for the DL data based on the UL grant DCI. When the UL grant DCI includes physical uplink shared channel (PUSCH) resource scheduling, and when the PUCCH resource overlaps with a PUSCH resource in the time domain, the ACK/NACK information is transmitted on a PUSCH, and when the UL grant DCI does not include PUSCH resource scheduling, the ACK/NACK information is transmitted in the PUCCH resource.

In another aspect of the present disclosure, a communication device for transmitting and receiving a signal in a wireless communication system includes at least one transceiver, at least one processor, and at least one memory operatively coupled to the at least one processor and storing instructions which when executed, cause the at least one processor to perform specific operations. The specific operations include receiving DL data based on DL grant DCI, receiving UL grant DCI indicating transmission of ACK/NACK information for the DL data and a PUCCH resource to be used for the transmission of the ACK/ACNK information, and transmitting the ACK/NACK information for the DL data based on the UL grant DCI. When the UL grant DCI includes PUSCH resource scheduling, and when the PUCCH resource overlaps with a PUSCH resource in the time domain, the ACK/NACK information is transmitted on a PUSCH, and when the UL grant DCI does not include PUSCH resource scheduling, the ACK/NACK information is transmitted in the PUCCH resource.

In the method or the device, when the UL grant DCI includes PUSCH resource scheduling, and when the PUCCH resource does not overlap with the PUSCH resource in the time domain, the PUCCH resource and the PUSCH resource may be contiguous in the time domain and located in the same band in the frequency domain.

In the method or the device, when the UL grant DCI includes PUSCH resource scheduling, a downlink assignment indicator (DAI) field in the UL grant DCI may be used for the transmission of the A/N information.

In the method or the device, when the UL grant DCI does not include PUSCH resource scheduling, a field related to UL data transmission in the UL grant DCI may be used for the transmission of the A/N information.

In the method or the device, when the UL grant DCI does not include PUSCH resource scheduling, a 1-bit flag in the UL grant DCI may be set to one of a first value indicating ACK/NACK information transmission and a second value indicating PUSCH transmission, and the ACK/NACK information may be transmitted based on the first value.

In the method or the device, when the UL grant DCI does not include PUSCH resource scheduling, a 1-bit flag in the UL grant DCI may be set to one of a first value indicating that the PUSCH does not include an uplink shared channel (UL-SCH) and a second value indicating that the PUSCH includes a UL-SCH, and the ACK/NACK information may be transmitted based on the first value.

In the method or the device, the UL grant DCI may indicate no channel state information (CSI) request.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication device may transmit a hybrid automatic repeat request-acknowledgment (HARQ-ACK) more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi™)), IEEE 802.16 (worldwide interoperability for microwave access (WiMAX™)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release S. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
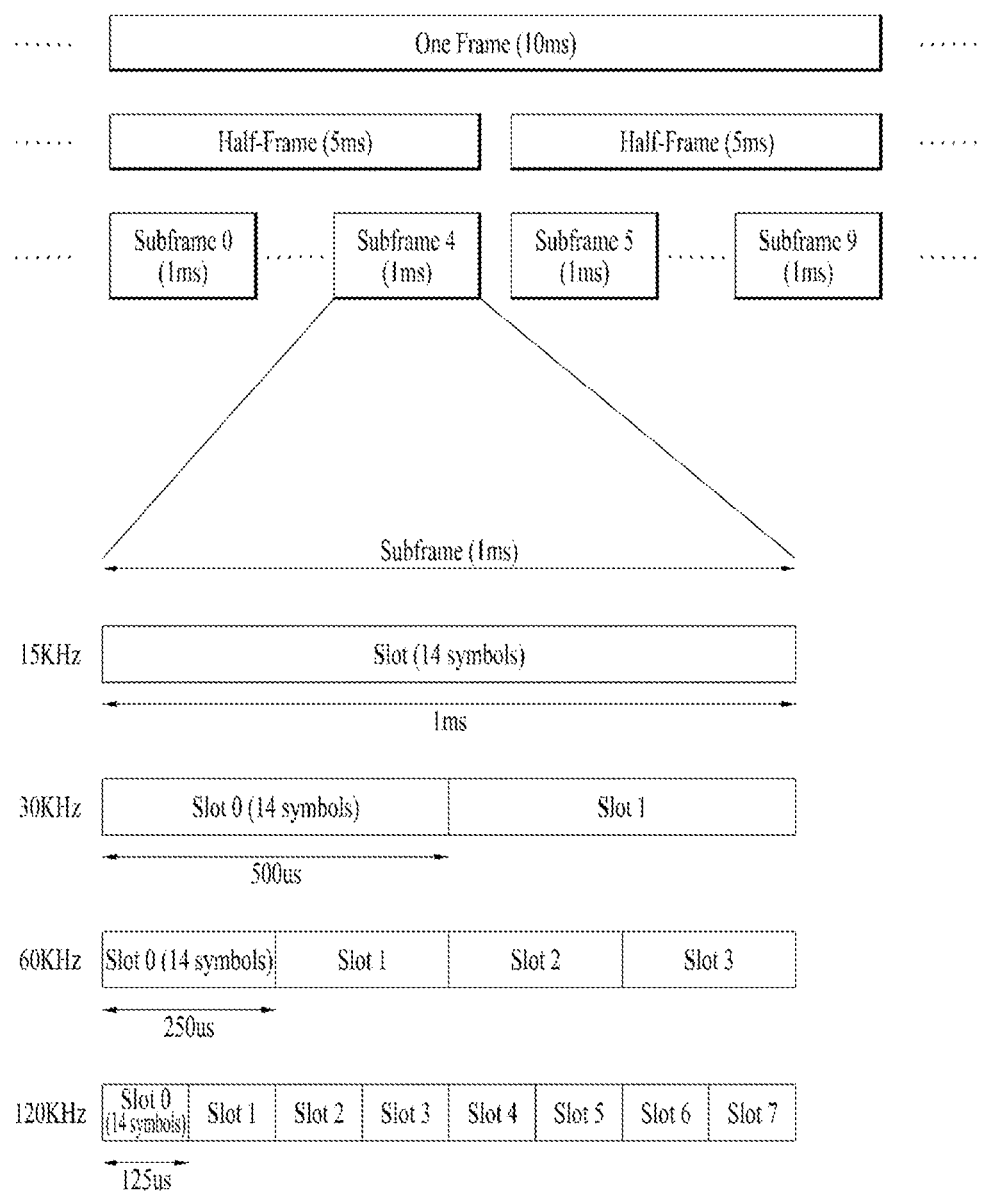
FIG. 1 illustrates a radio frame structure.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N_{symb}^{slot}$ | $N_{slot}^{frame,u}$ | $N_{slot}^{subframe,u}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: number of symbols in a slot
*$N_{slot}^{frame,u}$: number of slots in a frame
*$N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS (15*2^u) | $N_{symb}^{slot}$ | $N_{slot}^{frame,u}$ | $N_{slot}^{subframe,u}$ |
|---|---|---|---|
| 60 KHz (u = 2) | 17 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
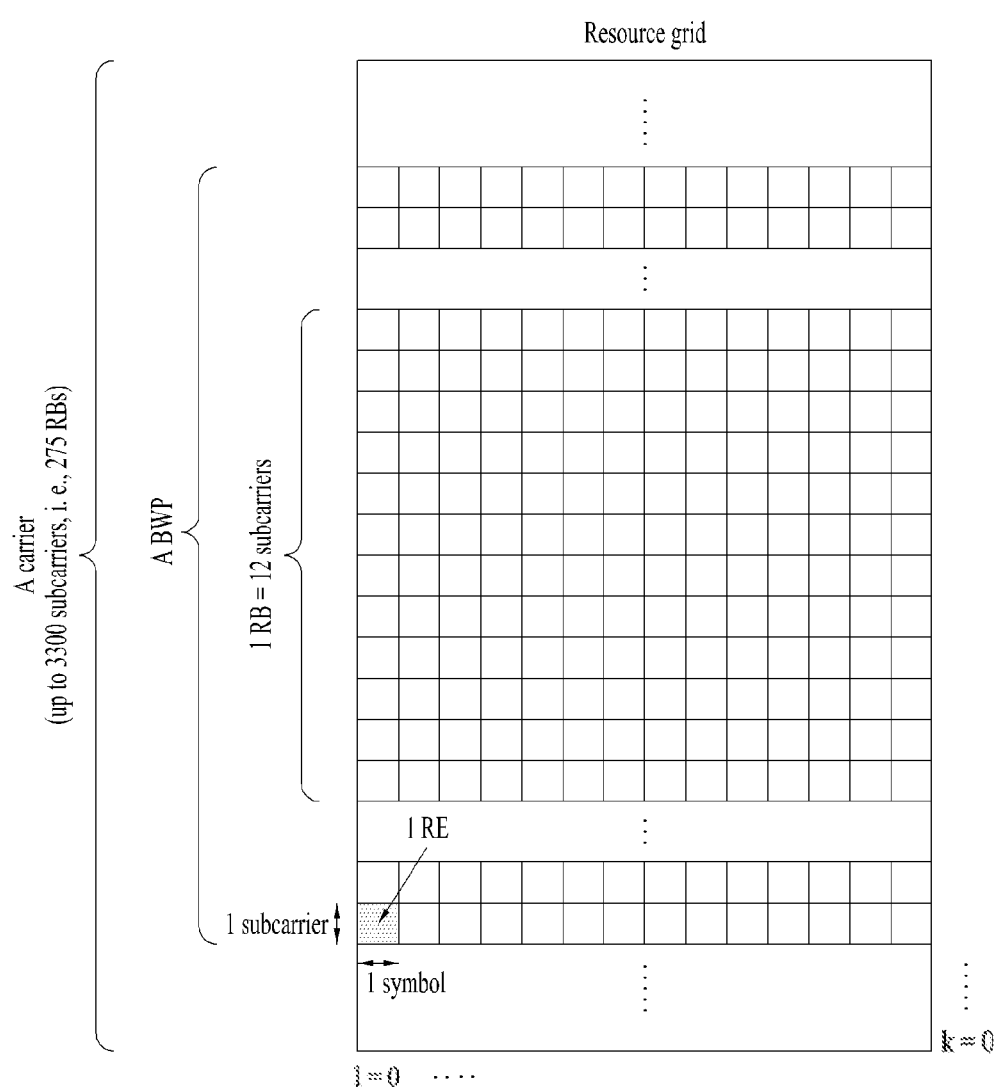
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
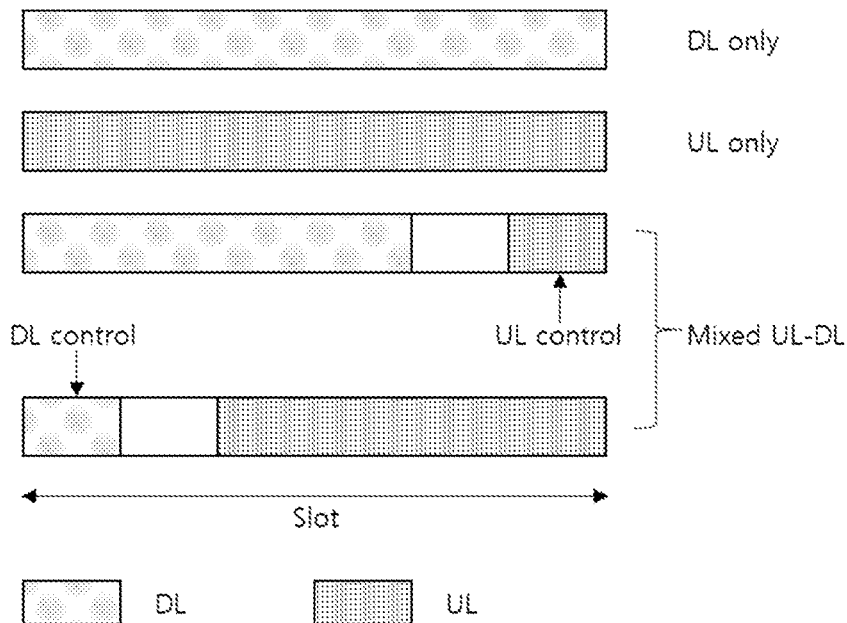
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Figure 4:
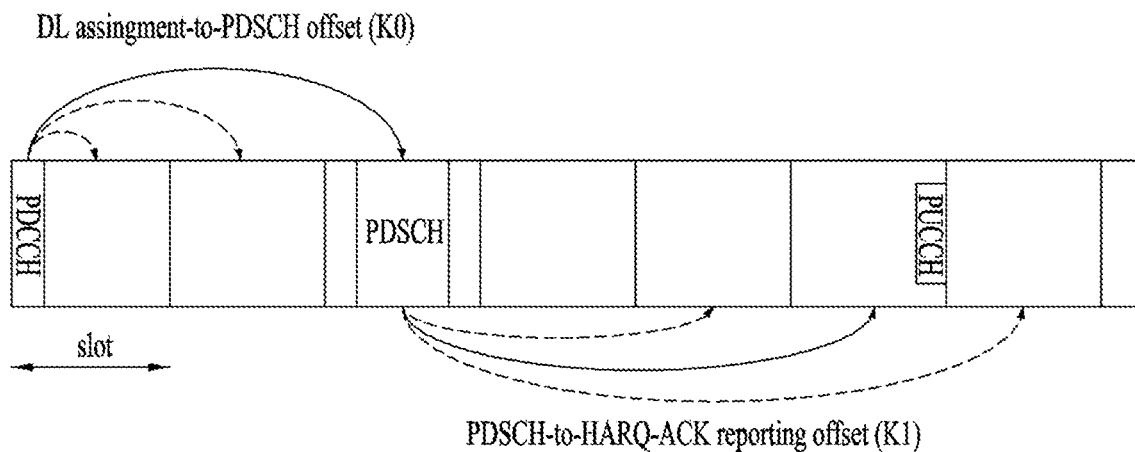
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n.

The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is-configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 5:
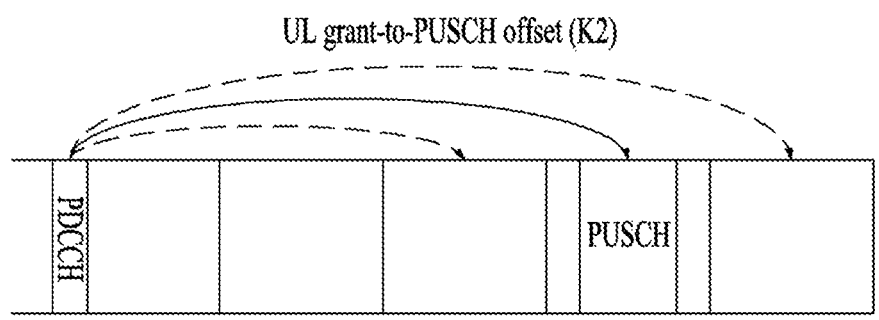
FIG. 5 illustrates a physical uplink shared channel (PUSCH) transmission process.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 6:
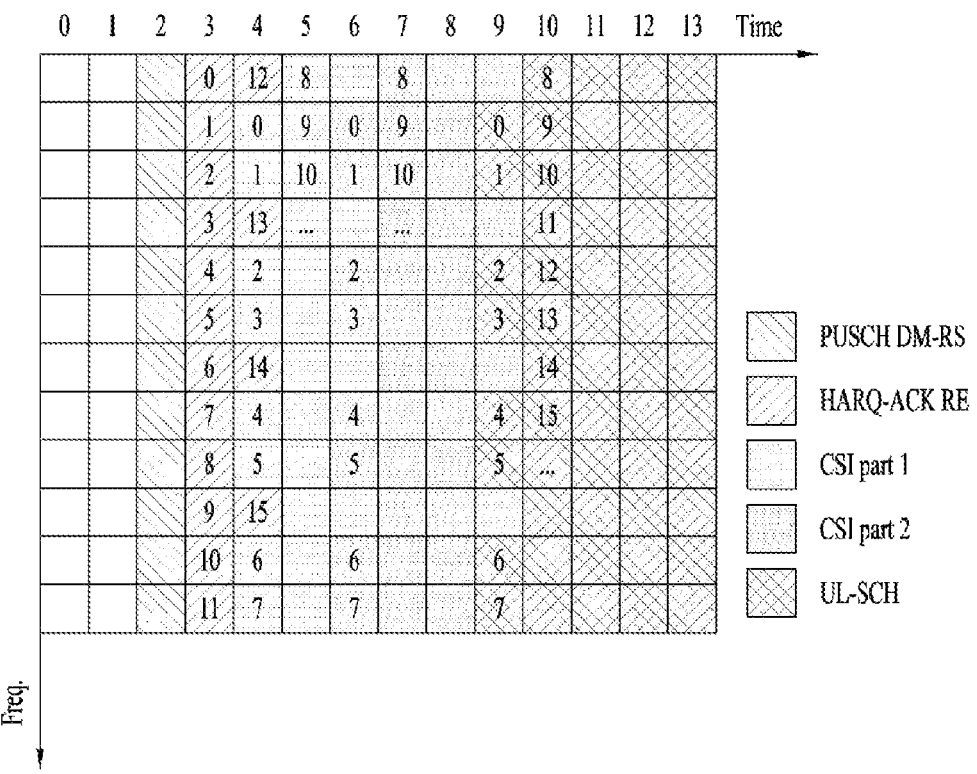
FIG. 6 illustrates exemplary multiplexing of control information in a PUSCH.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

1. Wireless Communication System Supporting Unlicensed Band

Figure 7:
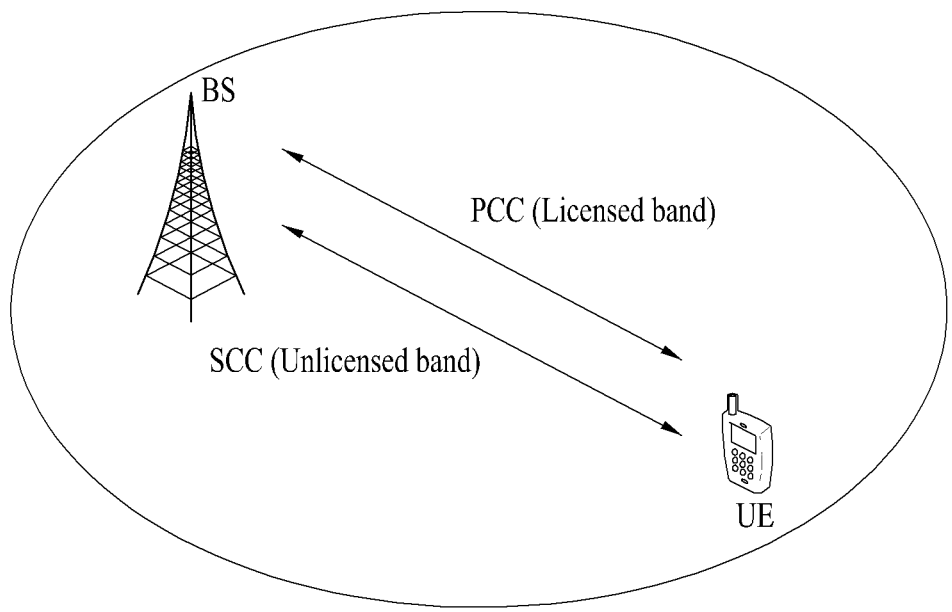
FIG. 7 illustrates a wireless communication system supporting an unlicensed band.
Figure 7:
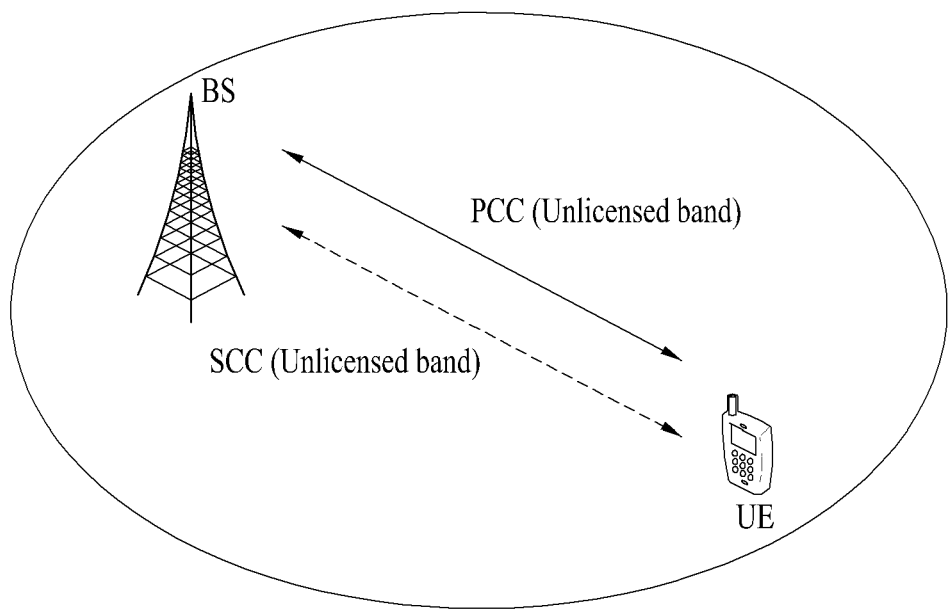

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 7(a), the LCC may be configured as a primary CC (PCC) and the UCC may be configured as a secondary CC (SCC). As illustrated in FIG. 7(b), the UE and the BS may transmit and receive signals in one UCC or a plurality of carrier-aggregated UCCs. That is, the UE and the BS may transmit and receive signals only in UCC(s) without an LCC.

Unless otherwise specified, a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 8:
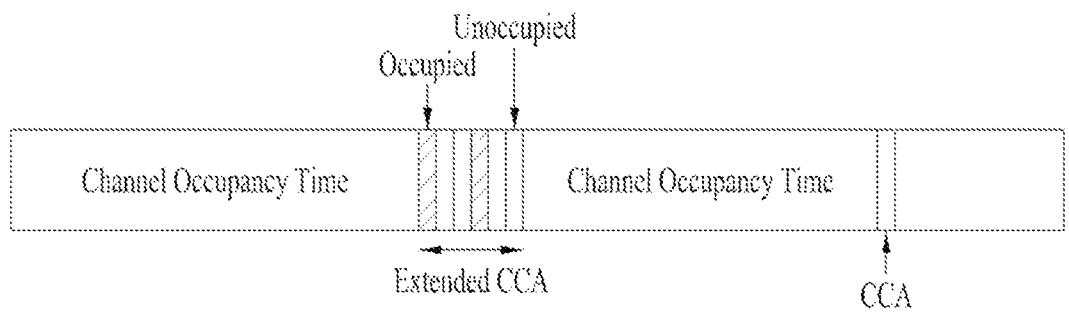
FIG. 8 illustrates an exemplary method of occupying resources in an unlicensed band.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy.

Otherwise, the communication node may determine that the channel is idle. When it is determined that the channel is idle, the communication node may start the signal transmission in the UCell. The Wi-Fi™ standard (802.11ac) specifies a CCA threshold of 62 dBm for non-Wi-Fi™ signals and a CCA threshold of −82 dBm for Wi-Fi™ signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

Figure 9:
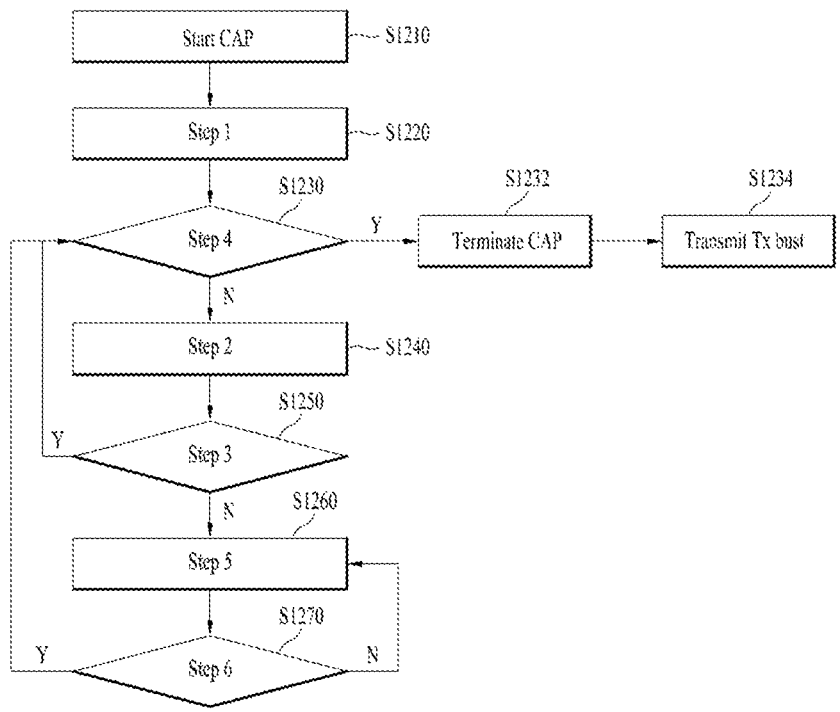
FIGS. 9 and 10 are flowcharts illustrating channel access procedures (CAPs) for signal transmission in an unlicensed band.

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that $m_p$, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 11, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}\%=25$ us. $T_{drs}$ includes a duration $T_f$ (=16 us) following one sensing slot duration $T_{dsf}$(=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 10:
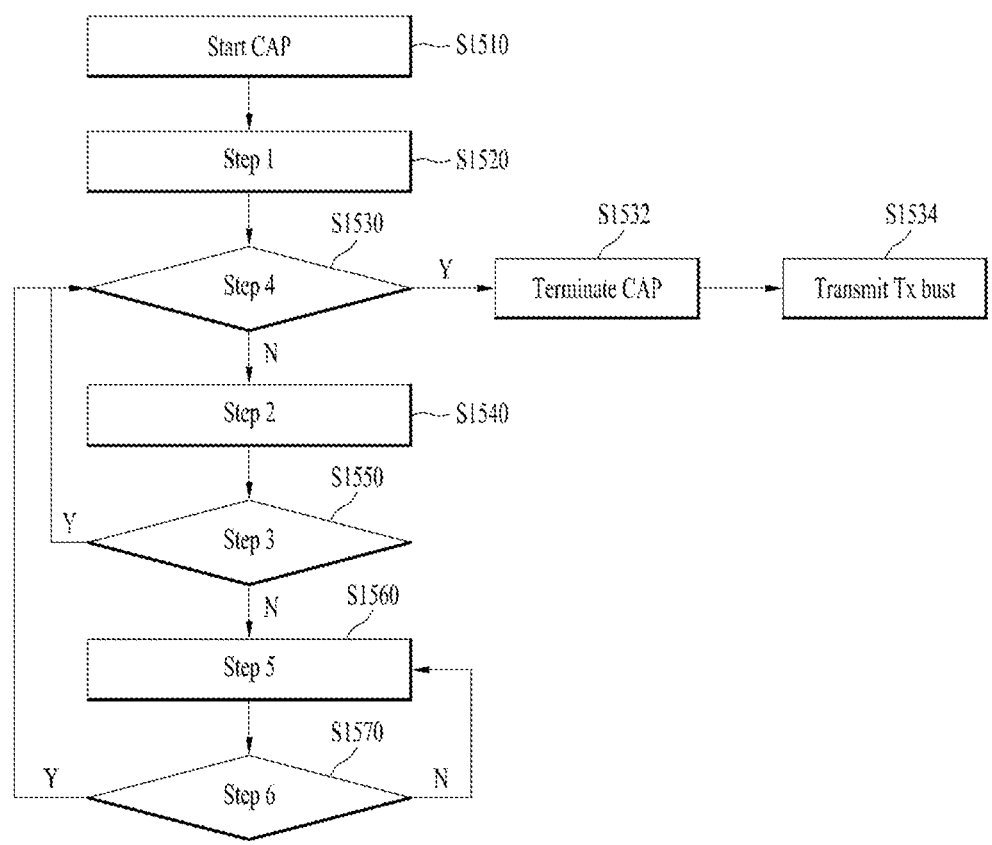

FIG. 10 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1534), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p∈{1,2,3,4}. Otherwise, the UE may increase $CW_p$ for every priority class p∈{1,2,3,4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0, n_1, \ldots n_w$, starting from the subframe (or slot) no without a gap (the subframe (or slot) $n_w$ is the most recent subframe (or slot) before a subframe (or slot) $n_g$-3 in which the UE has transmitted a UL-SCH based on a Type 1 CAP), the reference subframe (or slot) $n_{ref}$ is the subframe (or slot) no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration TA at the start thereof.

HARQ-ACK Transmission in Unlicensed Band

To support a stand-alone operation in a U-band, a UE operation of transmitting an HARQ-ACK feedback in the U-band based on a PUCCH/PUSCH transmission, in response to a DL data (e.g., PDSCH) reception may be essential (hereinafter, HARQ-ACK is referred to as A/N, for convenience).

For example, the BS may schedule a PDSCH transmission for the UE in a COT occupied by performing LBT (CCA) and indicate to the UE to transmit an A/N feedback for the PDSCH reception in the same COT (or in a gNB-initiated COT starting with/occupied for a DL transmission of the BS). This operation is referred to as intra-COT A/N transmission.

In another example, because of a UE processing time required for decoding a PDSCH signal and encoding an HARQ-ACK signal for the PDSCH signal, the UE may transmit an A/N feedback in response to reception of a PDSCH scheduled/transmitted in a COT, in another COT (or a period which does not belong to a gNB-initiated COT starting with/occupied for a DL transmission of the BS) following the COT may be indicated. This operation is referred to as inter-COT A/N transmission.

Methods of indicating A/N (PUCCH/PUSCH} transmission parameters in consideration of an LBT operation and a COT configuration in a U-band and an A/N transmission type (e.g., intra-COT A/N or inter-COT A/N) changing according to the LBT operation and the COT configuration, and related UE operations will be proposed below. The proposed methods are applicable in a similar manner, to an operation or process of transmitting UCI (e.g., CSI or SR) on a PUCCH/PUSCH, not limited to an operation of transmitting an HARQ-ACK feedback on a PUCCH/PUSCH. Further, the proposed methods described below are applicable in a similar manner, to an L-band (or U-band) operation without LBT, not limited to a U-band operation based on LBT.

Methods of configuring/transmitting an A/N feedback will be described below.

1) Timing-Based A/N Feedback Method (Hereinafter, Referred to as "t-A/N" Scheme)

A plurality of candidate HARQ (PDSCH-to-A/N) timings may be preconfigured by RRC signaling. One of the candidate HARQ timings may be indicated by (DL grant) DCI. The UE may transmit an A/N feedback for reception of a (plurality of) PDSCH(s) in a plurality of slots corresponding to the total candidate HARQ timing set at the HARQ timing indicated by the DCI. This method of configuring and transmitting an A/N feedback may be referred to as a type-SAN codebook.

Alternatively, in addition to the HARQ timing indication, a counter downlink assignment index (counter-DAI) and/or a total-DAI may also be signaled by the DCI. The counter-DAI may indicate the scheduling order of the PDSCH corresponding to the (DL grant) DCI. The total-DAI may indicate the total number of PDSCHs scheduled up to the current time. The UE may transmit A/Ns for PDSCHs corresponding to counter-DAI values from an initial counter-DAI value to the last (received) total-DAI value at the indicated HARQ timing. This method of configuring and transmitting an A/N feedback may be referred to as a type-2 A/N codebook.

2) Pooling-Based A/N Feedback Method (Hereinafter, Referred to as p-A/N Scheme)

Pending of an A/N feedback transmission for a corresponding PDSCH may be indicated by DL grant DCI. Subsequently, transmission of an A/N feedback for a PDSCH corresponding to total DL HARQ process IDs or some specific DL HARQ process ID(s) at a timing configured/indicated by a specific signal (e.g., RRC signaling or DCI) may be indicated by specific DCI (e.g., DL grant DCI, UL grant DCI, or other DCI) (pooling). This method of configuring and transmitting an A/N feedback may be referred to as a type-3 A/N codebook.

Further, when counter-DAI/total-DAI signaling is further configured in the t-A/N scheme which is placed in a switching relationship with the p-A/N scheme, an A/N transmission for a PDSCH corresponding to an HARQ process ID indicated by pooling-indicating DCI may be pooled. Alternatively, a total-DAI value may be indicated by pooling-indicating DCI, and an A/N transmission for a PDSCH corresponding to the indicated total-DAI value may be pooled.

Figure 11:
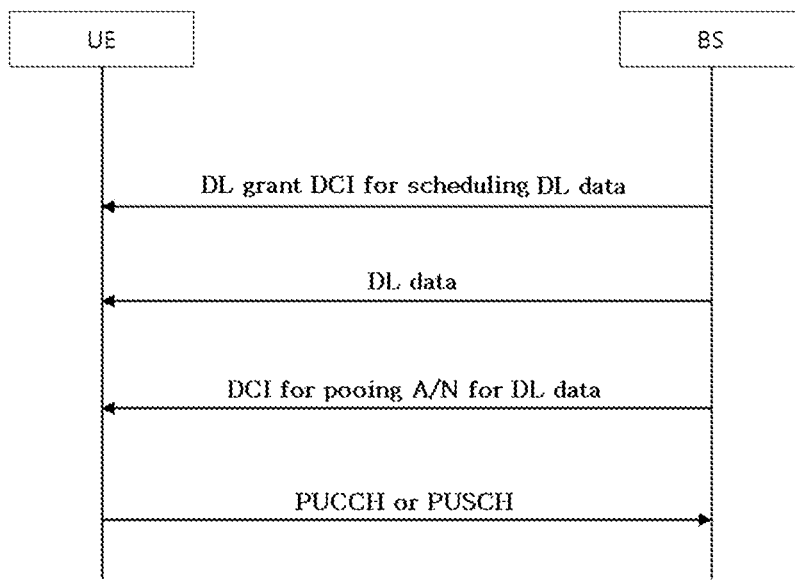
FIGS. 11 and 13 are flowcharts according to an embodiment of the present disclosure.

FIG. 11 is a flowchart according to an embodiment of the present disclosure.

Referring to FIG. 11, a UE receives DL grant DCI that schedules DL data from a BS. The DL grant DCI may indicate the t-A/N scheme or the p-A/N scheme in which an HARK-ACK for the scheduled DL data is to be transmitted. Further, the DL grant DCI may indicate A/N pending for the p-A/N scheme.

The UE receives the DL data based on the DL grant DCI.

When the DL grant DCI indicates the t-A/N scheme, the UE transmits an A/N for the DL data on a PUCCH or a PUSCH without receiving additional DCI.

When the DL grant DCI indicates the p-A/N scheme, the UE receives DCI indicating A/N pooling for the DL data. The type and configuration of the DCI indicating A/N pooling may be based on an embodiment to be described below.

Upon receipt of the DCI indicating A/N pooling, the UE transmits the A/N for the DL data on a PUCCH or a PUSCH. A specific transmission method, such as a resource/channel in which the A/N is transmitted, may be based on an embodiment to be described below.

DL Grant DCI-Based Pooling

Switching between the t-A/N scheme and the p-A/N scheme may be indicated by DL grant DCI. Alternatively, whether to apply the t-A/N scheme or the p-A/N scheme to configure/transmit an A/N feedback may be indicated by the DL grant DCI. Additionally, even A/N pending and A/N pooling for the p-A/N scheme (e.g., whether the A/N feedback transmission of the UE will be pended or pooling of the A/N feedback transmission of the UE will be indicated) may be indicated by the same DL grant DCI.

Additionally, configuration/related information about the A/N feedback subject to pooling may further be indicated by the DL grant DCI indicating A/N pooling. The configuration/related information about the A/N feedback subject to pooling may be, for example, information related to a CC group, an HARQ process ID set, and/or a total-DAI, for which the A/N feedback is to be transmitted.

In a method of indicating A/N scheme switching by the same DL grant DCI, the DL grant DCI may indicate the t-A/N scheme or the p-A/N scheme by a 1-bit flag. Additionally, a specific field in the DL grant DCI may be interpreted differently according to the value of the 1-bit flag. The specific field may indicate information related to an A/N transmission, and may be referred to as an A-field hereinbelow.

When the 1-bit flag indicates the t-A/N scheme, one HARQ timing (among a plurality of candidate HARQ timings) may be indicated by the A-field.

When the 1-bit flag indicates the p-A/N scheme, pending or pooling of the A/N feedback transmission may be indicated by the A-field. When the A-field indicates pooling of the A/N feedback transmission, the A-field may further indicate a timing at which the A/N feedback subject to pooling will be transmitted. When counter-DAI/total-DAI signaling is configured for the t-A/N scheme in a switching relationship with the p-A/N scheme, a DAI field for the t-A/N scheme may indicate configuration/related information about the A/N feedback subject to pooling, in the DL grant DCI indicating A/N pooling. The configuration/related information about the A/N feedback subject to pooling may be, for example, information related to a CC group, an HARQ process ID set, and/or a total-DAI, for which the A/N feedback is to be transmitted. When A/N pending is indicated by the A-field, a counter-DAI may be signaled, without a total-DAI by the DL grant DCI.

Alternatively, an indication of switching between the t-A/N scheme and the p-A/N scheme and information related to the indicated A/N scheme may be transmitted together in the A-field, not the 1-bit flag in the DL grant DCI. For example, one of {t-A/N with timing X1, t-A/N with timing X2, ..., A/N pending, A/N pooling in timing Y1, A/N pooling in timing Y2, ...} may be indicated by the A-field. t-A/N with timing X represents a t-A/N-based A/N feedback transmission at timing X. A/N pooling in timing Y represents a p-A/N-based A/N feedback transmission at timing Y.

Characteristically, an A/N feedback transmission timing corresponding to A/N pooling may have one value. The one value may be preset or indicated to the UE by RRC signaling from the BS. When counter-DAI/total-DAI signaling is configured for the t-A/N scheme in the switching relationship with the p-A/N scheme, the DAI field for the t-A/N scheme may indicate configuration/related information about the A/N feedback subject to pooling in the DL grant DCI indicating A/N pooling in the p-A/N scheme. The configuration/related information about the A/N feedback subject to pooling may be, for example, information related to a CC group, an HARQ process ID set, and/or a total-DAI, for which the A/N feedback is to be transmitted. When A/N pending is indicated by the A-field, a counter-DAI may be signaled without a total-DAI by the DL grant DCI.

UL Grant DCI-Based Pooling

Switching between the t-A/N scheme and the p-A/N scheme may be indicated by DL grant DCI. Alternatively, whether to transmit an A/N in the t-A/N scheme or to pend the A/N transmission to apply the p-A/N scheme may be indicated by the DL grant DCI. For example, one of {t-A/N with timing X1, t-A/N with timing X2, ..., A/N pending} may be indicated by the A-field of the DL grant DCI. A/N pooling for the p-A/N scheme may be indicated by UL grant DCI. Hereinbelow, an A/N feedback subject to pooling may be referred to as a pooled A/N.

Additionally, configuration/related information about the pooled A/N may be indicated by the UL grant DCI indicating A/N pooling. The configuration/related information about the pooled A/N may be, for example, information about a CC group, an HARQ process ID set related to DL data transmission, and/or a total-DAI, for which the A/N feedback is to be transmitted.

In a method of indicating A/N pooling by UL grant DCI, the UL grant DCI may indicate a transmission timing of a pooled A/N and PUCCH resources to be used for the A/N transmission, together with information indicating whether A/N pooling is applied. When the UL grant DCI indicates A/N pooling, the UL grant DCI may still include PUSCH scheduling and include information for the PUSCH scheduling. Alternatively, when the UL grant DCI indicates A/N pooling, the UL grant DCI may not include the PUSCH scheduling and the information for the PUSCH scheduling. The PUSCH scheduling and the information for the PUSCH scheduling may be information related to a time/frequency-domain resource assignment (RA) and/or a modulation and coding scheme (MCS)/transport block size (TBS).

In the case where the UL grant DCI indicating A/N pooling includes PUSCH scheduling, when the PUCCH timing/resource for the pooled A/N overlaps with a scheduled PUSCH timing/resource (on the time axis), the pooled A/N may be piggybacked to the PUSCH.

When the UL grant DCI indicating A/N pooling includes PUSCH scheduling, characteristically, a timing/resource relationship between the pooled A/N and the PUSCH may be configured/indicated such that the pooled A/N and the PUSCH are transmitted contiguously in time and in the same resources in frequency (in consideration of an efficient LBT operation and a power transient effect).

In the case where the UL grant DCI indicating A/N pooling includes PUSCH scheduling, when counter-DAI/total-DAI signaling is configured for the t-A/N scheme in the switching relationship with the p-A/N scheme, the DAI field for the t-A/N scheme may indicate configuration/related information about the pooled A/N in the UL grant DCI indicating A/N pooling for the p-A/N scheme. The pooled A/N configuration/related information may be, for example, information related to a CC group, an HARQ process ID set related to DL data transmission, and/or a total-DAI, for which the A/N feedback is to be transmitted.

When the UL grant DCI indicating A/N pooling does not include PUSCH scheduling, pooled A/N feedback configuration/transmission-related information may be indicated by a field related to PUSCH scheduling in the UL grant DCI. The field related to PUSCH scheduling may be, for example, a field related to an RA, an MCS/TBS, an HARQ process ID related to UL data transmission, and/or a new data indicator (NDI)/redundancy version (RV). The pooled A/N feedback configuration/transmission-related information may be, for example, information related to an A/N transmission timing, an A/N PUCCH resource, a CC group, a HARQ process ID set related to a DL data transmission, and/or a total-DAI, for which an A/N feedback is to be transmitted.

When the UL grant DCI indicating A/N pooling does not include PUSCH scheduling, that is, when the A/N is transmitted on a PUCCH, without being piggybacked to a PUSCH, a 1-bit flag of the UL grant DCI may indicate whether the UL grant DCI indicates A/N pooling without PUSCH scheduling or includes PUSCH scheduling without A/N pooling. The UE may transmit UL data on the PUSCH or an A/N on the PUCCH based on the 1-bit flag. In this case, the UE may determine based on definition of the new 1-bit flag (or field) whether pooling is explicitly indicated.

Alternatively, when the UL grant DCI indicating A/N pooling does not include PUSCH scheduling, the 1-bit flag in the UL grant DCI may indicate only the presence or absence of a UL-SCH transmission. When the 1-bit flag indicates that there is no UL-SCH transmission (and no CSI request), the UE may consider that A/N pooling is indicated.

The UE may receive the UL grant DCI in DCI format 0_1. The 1-bit flag indicating whether a UL-SCH is transmitted may be, for example, a UL-SCH indicator.

If the value of the UL-SCH indicator is 1, this implies the presence of a UL-SCH to be transmitted on the PUSCH. Therefore, the UE may understand that the UL grant DCI schedules a PUSCH transmission. Since the UL grant DCI does not indicate simultaneous transmission of a PUSCH and an A/N, the UE may not transmit the A/N on the PUSCH.

If the value of the UL-SCH indicator is 0, there is no UL-SCH to be transmitted on the PUSCH. Therefore, the UE may understand that the UL grant DCI does not schedule a PUSCH transmission. The UE may transmit the A/N on the PUCCH, understanding that the UL grant DCI indicates A/N pooling.

If the value of the UL-SCH indicator is 0, the UE may further check whether CSI is requested, in addition to UL-SCH transmission. The CSI request may be transmitted in a CSI request field set in one of 0 to 6 bits in the UL grant DCI. Conventionally, only when the cyclic redundancy check (CRC) of DCI is scrambled with a semi-persistent-CSI-radio network temporary identifier (SP-CSI-RNTI), both the UL-SCH indicator and the CSI request field may be set to 0. In the present disclosure, to indicate that there is neither a UL-SCH transmission and nor a CSI request, both the UL-SCH indicator and the CSI request field may be 0 even when the CRC of the DCI is not scrambled with an SP-CSI-RNTI. When both the UL-SCH indicator and the CSI request field are 0, the UE may transmit the A/N on the PUCCH, considering that A/N pooling is indicated. In this case, since new information indicating A/N pooling or non-A/N pooling is provided just by an existing field, backward compatibility may be guaranteed for the UE, and a DCI payload size may not increase.

In the case where the scheduled PUSCH includes (or is indicated to include) a UL-SCH, when counter-DAI/total-DAI signaling is configured for the t-A/N scheme in the switching relationship with the p-A/N scheme, the DAI field for the t-A/N scheme may indicate pooled A/N configuration/related information in the UL grant DCI indicating A/N pooling for the p-A/N scheme. The pooled A/N configuration/related information may be, for example, information related to a CC group, an HARQ process ID set related to DL data transmission, and/or a total-DAI, for which the A/N feedback is to be transmitted.

When the scheduled PUSCH does not include (or is indicated not to include) a UL-SCH, pooled A/N feedback configuration/related information may be indicated by a specific field in the UL grant DCI. The specific field in the UL grant DCI may be, for example, a field related to an RA, an MCS/TBS, a HARQ process ID related to UL data transmission, and/or an NDI/RV. The pooled A/N feedback configuration/related information may be, for example, information about a CC group, an HARQ process ID set related to DL data transmission, and/or a total-DAI, for which the A/N feedback is to be transmitted.

Alternatively, in a method of indicating A/N pooling by UL grant DCI, when A/N pooling is indicated by the UL grant DCI, a pooled A/N may be transmitted at a PUSCH timing/resource scheduled by the UL grant DCI.

When the pooled A/N is transmitted on the PUSCH, it may be indicated that the scheduled PUSCH includes or does not include a UL-SCH. In other words, the pooled A/N may be transmitted alone or together with UL data on the PUSCH.

Alternatively, when the pooled A/N is transmitted on the PUSCH, it may be defined that the scheduled PUSCH does not include a UL-SCH. In other words, when the pooled A/N is transmitted on the PUSCH, UL data is not transmitted on the PUSCH. When UL data is transmitted on the PUSCH, the A/N is not transmitted on the PUSCH.

When it is defined that the scheduled PUSCH does not include a UL-SCH at all, that is, when UL data and an A/N are not simultaneously transmitted on one PUSCH, it may be indicated by a 1-bit flag in the UL grant DCI whether an A/N is transmitted without a UL-SCH (on the scheduled PUSCH) or a UL-SCH is transmitted without a pooled A/N (on the scheduled PUSCH). Alternatively, the 1-bit flag in the UL grant DCI may indicate only the presence or absence of a UL-SCH transmission. When the 1-bit flag indicates that there is no UL-SCH transmission (and no CSI request), the UE may consider that A/N pooling is indicated.

In the case where the scheduled PUSCH includes (or is indicated to include) a UL-SCH, when counter-DAI/total-DAI signaling is configured for the t-A/N scheme in the switching relationship with the p-A/N scheme, the DAI field for the t-A/N scheme may indicate pooled A/N configuration/related information in the UL grant DCI indicating A/N pooling for the p-A/N scheme. The pooled A/N configuration/related information may be, for example, information related to a CC group, an HARQ process ID set related to DL data transmission, and/or a total-DAI, for which the A/N feedback is to be transmitted.

When the scheduled PUSCH does not include (or is indicated not to include) a UL-SCH, pooled A/N feedback configuration/related information may be indicated by a specific field in the UL grant DCI. The specific field in the UL grant DCI may be, for example, a field related to an RA, an MCS/TBS, a HARQ process ID related to UL data transmission, and/or an NDI/RV. The pooled A/N feedback configuration/related information may be, for example, information about a CC group, an HARQ process ID set related to DL data transmission, and/or a total-DAI, for which the A/N feedback is to be transmitted.

Common DCI-Based Pooling

Switching between the t-A/N scheme and A/N pending for the p-A/N scheme may be indicated by DL grant DCI. Alternatively, whether an A/N is to be transmitted in the t-A/N scheme or the A/N transmission is to be pended to apply the p-A/N scheme may be indicated by the DL grant DCI. For example, one of {t-A/N with timing X1, t-A/N with timing X2, . . . , A/N pending} may be indicated by an A-field in the DL grant DCI. The A/N pooling operation for the p-A/N scheme may be indicated by a UE (group)-common DCI (UE group common DCI, hereinafter referred to as common DCI).

Additionally, pooled A/N configuration/related information may further be indicated by the common DCI indicating A/N pooling. The pooled A/N feedback configuration/related information may be, for example, information related to a CC group, an HARQ process ID set, and/or a total-DAI, for which an A/N feedback is to be transmitted.

In a method of indicating A/N pooling by common DCI, an A/N transmission timing and an A/N PUCCH resource for a pooled A/N transmission may be preconfigured UE-specifically by RRC signaling. The common DCI may indicate only A/N pooling or non-A/N pooling for each UE by a 1-bit flag included in the common DCI.

Alternatively, in a method of indicating A/N pooling by common DCI, a plurality of combinations of {A/N transmission timing, A/N PUCCH resource} for the pooled A/N feedback transmission may be preconfigured UE-specifically by RRC signaling. The common DCI may include K-bit information (K>1) for each UE. The common DCI may indicate one of the combinations of {A/N transmission timing, A/N PUCCH resource} for a specific UE by K bits. The common DCI may further indicate A/N pooling or non-A/N pooling by the K bits.

Alternatively, in a method of indicating A/N pooling by common DCI, a single value for one of an A/N transmission timing and an A/N PUCCH resource for the pooled A/N feedback transmission, and a plurality of candidates values for the other may be preconfigured UE-specifically by RRC signaling. The common DCI may include L-bit (L>1) information for each UE. The common DCI indicates the A/N transmission timing and a specific one of the plurality of candidate values for the A/N PUCCH resource by the L bits. The common DCI may further indicate A/N pooling or non-A/N pooling by the L bits.

DL Grant DCI-Based Pooling in Consideration of PDSCH Scheduling

Switching between the t-A/N scheme and A/N pending for the p-A/N scheme may be indicated by DL grant DCI including PDSCH scheduling and information for the PDSCH scheduling (e.g. an RA or an MCS/TBS). Alternatively, whether an A/N is to be transmitted in the t-A/N scheme or to be pended to apply the p-A/N scheme may be indicated by the DL grant DCI including PDSCH scheduling and information for the PDSCH scheduling. For example, one of (t-A/N with timing X1, t-A/N with timing X2, . . . , A/N pending) may be indicated by an A-field in the DL grant DCI. The A/N pooling operation for the p-A/N scheme may be indicated by DL grant DCI that does not include PDSCH scheduling.

Specifically, A/N pooling, and a transmission timing and an A/N PUCCH resource of a pooled A/N feedback transmission may be indicated by the DL grant DCI that does not include PDSCH scheduling. Since PDSCH scheduling is not included in the DL grant DCI, pooled A/N feedback configuration/transmission-related information may be indicated by a field related to PDSCH scheduling in the DL grant DCI. The field related to PDSCH scheduling may be, for example, a field related to an RA, an MCS/TBS, an HARQ process ID, and/or an NDI/RV. The pooled A/N feedback configuration/transmission-related information may be, for example, information about an A/N transmission timing, an A/N PUCCH resource, a CC group subject to A/N feedback, an HARQ process ID set, and/or a total-DAI.

Dynamic Adaptation of A/N Payload Size

When an A/N feedback is configured based on the t-A/N scheme, an HARQ timing set and/or a CC group, for which the A/N feedback is to be transmitted among candidate HARQ timings, may be indicated by DL grant DCI in order to dynamically increase or decrease an A/N payload size.

Alternatively, for each PUCCH resource or PUCCH resource set, an HARQ timing set and/or a CC group, for which an A/N feedback is to be transmitted, may be configured by RRC signaling. When a specific PUCCH resource is indicated by the DL grant DCI, an A/N feedback corresponding to an HARQ timing set and/or a CC group, which is associated with the indicated PUCCH resource among PUCCH resources preconfigured by RRC signaling, may be configured/transmitted. Alternatively, when a specific PUCCH resource set is indicated by the DL grant DCI, an A/N feedback corresponding to an HARQ timing set and/or a CC group, which is associated with the indicated PUCCH resource set among PUCCH resource sets preconfigured by RRC signaling, may be configured/transmitted.

Additionally, a total-DAI value for an A/N feedback transmission may be preconfigured for each PUCCH resource or PUCCH resource set by RRC signaling in order to dynamically increase or decrease an A/N payload size, when an A/N feedback is configured based on the t-A/N scheme configured with DAI signaling. When a specific PUCCH resource is indicated by DL grant DCI, an A/N feedback corresponding to the total-DAI value associated with the indicated PUCCH resource among PUCCH resources configured by RRC signaling may be configured/transmitted. Alternatively, when a specific PUCCH resource set is indicated by the DL grant DCI, an A/N feedback corresponding to a total-DAI value associated with the indicated PUCCH resource set among PUCCH resource sets configured by RRC signaling may be configured/transmitted.

To dynamically increase or decrease an A/N payload size when an A/N feedback is configured based on the p-A/N scheme, an HARQ ID set for which the A/N feedback is to be transmitted among HARQ process ID sets and/or a CC group may be indicated by DCI indicating A/N pooling.

Alternatively, for each PUCCH resource or PUCCH resource set, an HARQ ID set and/or a CC group, for which an A/N feedback is to be transmitted, may be configured by RRC signaling. When a specific PUCCH resource is indicated by DL grant DCI, an A/N feedback corresponding to an HARQ ID set and/or a CC group, which is associated with the indicated PUCCH resource among PUCCH resources preconfigured by RRC signaling, may be configured/transmitted. Alternatively, when a specific PUCCH resource set is indicated by DL grant DCI and/or a CC group, an A/N feedback corresponding to an HARQ ID set and/or a CC group, which is associated with the indicated PUCCH resource set among PUCCH resource sets preconfigured by RRC signaling, may be configured/transmitted.

In another example, when a plurality of bits included in an RA field of DCI indicate an invalid resource allocation (e.g., when all of the bits of the RA field indicate '1' in a state in which an (RB-based or RBG-based) RIV resource allocation scheme is indicated, or when all of the bits of the RA field indicate '0' in a state in which an (RB-based or RBG-based) bitmap resource allocation scheme is indicated), the UE may operate, considering/interpreting that A/N pooling is indicated by the DCI. In this case, pooled A/N configuration/transmission-related information (e.g., an A/N transmission timing, an A/N PUCCH resource, a CC group/HARQ process ID set, or a total-DAI) may be indicated by the remaining fields of the DCI (e.g., an A/N timing indicator field, an A/N PUCCH resource allocation field, an MCS/TBS, an HARQ process ID, and an NDI/RV).

The above method may also be applied in the same manner, with DCI replaced with UL grant DCI.

When a valid resource allocation is indicated by the RA field of the DCI, the UE may operate, considering/interpreting that switching between the t-A/N scheme and A/N pending for application of the p-A/N scheme (e.g., application of the t-A/N scheme or pending of an A/N feedback transmission (for applying the p-A/N scheme)) is indicated (simultaneously with PDSCH transmission scheduling) by the DCI.

Addition of Pended A/N to Type-1 A/N Codebook

When DL grant DCI indicates pending of an A/N feedback to a UE, which has been configured with a specific (e.g., type-1) A/N codebook scheme based on the t-A/N scheme, the pended A/N may be transmitted in the form of a type-3 A/N codebook by indicating A/N pooling separately by specific DCI. Alternatively, when DL grant DCI indicates pending of an A/N feedback to a UE, which has been configured with a specific A/N codebook scheme based on the t-A/N scheme, an A/N in the form of a type-1 A/N codebook and a pended A/N (e.g., single A/N payload obtained by adding the pended A/N to the type-1 A/N codebook) may be configured/transmitted together at an HARQ timing indicated by another DL grant DCI, without DCI indicating A/N pooling.

For example, transmission of PDSCH #1 in slot #n and transmission of an A/N feedback corresponding to PDSCH #1 in slot #(n+K1) may be indicated by a specific DL grant DCI. Transmission of PDSCH #2 in slot #(n+L1) and pending of an A/N feedback corresponding to PDSCH #2 may be indicated by another DL grant DCI. Herein, K1>L1. Transmission of PDSCH #3 in slot #(n+L2) and transmission of an A/N feedback corresponding to PDSCH #3 in slot #(n+K2) may be indicated by a third DL grant DCI. Herein, K2>K1 and L2>L1. A/N payload transmitted in slot #(n+K1) may be configured with A/N information for PDSCH receptions including PDSCH #1 within a bundling window corresponding to slot #(n+K1). A/N payload transmitted in slot #(n+K2) may be configured with the pended A/N for PDSCH #2 in addition to A/N information for PDSCH receptions including PDSCH #3 within a bundling window corresponding to slot #(n+K2).

When A/N payload is configured/transmitted by adding a pended A/N to a type-1 A/N codebook, 1) the total size of the pended A/N information/the total number of the pended A/N bits and 2) the mapping order between the pended A/N information/bits in the A/N payload should be matched between the UE and the BS. A probable mismatch between the UE and the BS regarding the number or mapping order of the pended A/Ns in the A/N payload causes serious ACK/NACK (e.g., NACK-to-ACK) errors as well as degradation of UCI decoding performance. Therefore, unnecessary PDSCH retransmission overhead and long latency may result.

In consideration of the problem, a (maximum) allowed size/number of pended A/N information/bits (e.g., P bits) to be added to a type-1 A/N codebook may be configured for the UE by RRC signaling from the BS. The UE may configure final A/N payload by adding P bits to A/N payload based on a type-1 A/N codebook, regardless of the presence or absence of an actually pended A/N.

In another method, the BS may indicate to the UE whether there is a pending A/N or P bits are to be added by a specific (e.g., 1-bit) field in DCI (e.g., DL grant DCI). The UE may configure final A/N payload by adding or not adding P bits to A/N payload based on a type-1 A/N codebook according to the information indicated by the specific field.

In another method, a plurality of candidates for the number P of bits for the pended A/N may be configured for the UE. The candidates for the number P of bits for the pended A/N may include 0. The candidates for the number P of bits for the pended A/N may be configured for the UE by RRC signaling from the BS. One of the candidates for the number P of bits for the pended A/N may be indicated by a specific field in DCI. The DCI may be DL grant DCI. The UE may configure final A/N payload by adding the number of bits corresponding to the indicated value to A/N payload of the type-1 A/N codebook scheme.

Additionally, in order to match the mapping order of pended A/N information/bits in A/N payload between the BS and the UE, the transmission/scheduling order of a PDCCH/PDSCH corresponding to an indicated A/N pending among total PDCCHs/PDSCHs for which the A/N pending is indicated may be transmitted by a specific field in DCI indicating A/N feedback pending. The order value may be a counter value. The UE may configure final A/N payload by adding pended A/N bits configured/mapped according to the order of the counter value to A/N payload of the type-1 A/N codebook scheme. The field indicating the counter value in the DCI may be a field for allocating PUCCH resources to be used for the A/N feedback transmission. The DCI may be DL grant DCI. The field for allocating PUCCH resources may be a PUCCH resource indicator (PRI) field. The A/N information of the type-1 A/N codebook scheme is first mapped to a low bit index, followed by mapping of the pended A/N information to a high bit index in the final A/N payload.

Additionally, to prevent an A/N payload mismatch between the UE and the BS, a timing available for transmission of the pended A/N may be configured/set. At the configured timing, a specific number of P bits may be added to the type-1 A/N codebook and transmitted. Specifically, when an A/N feedback pending operation is indicated for a PDSCH transmitted in slot #n by DCI transmitted in slot #n, the pended A/N may be transmitted only on a PUCCH or PUSCH transmitted at a timing including/after slot #(n+T) and/or a timing including/after slot #(n+T+F).

The DCI may be DL grant DCI. The PUCCH or PUSCH may be a PUCCH or PUSCH configured for an A/N transmission in the type-1 A/N codebook scheme. Additionally, when a slot in which the PDSCH corresponding to the pended A/N has been received coincides with slot #X included in a bundling window corresponding to an A/N transmission timing indicated by any DCI, the UE may configure a type-1 A/N codebook for the bundling window by mapping the pended A/N information/bits to A/N bits corresponding to slot #X. The DCI may be DL grant DCI.

Figure 12:
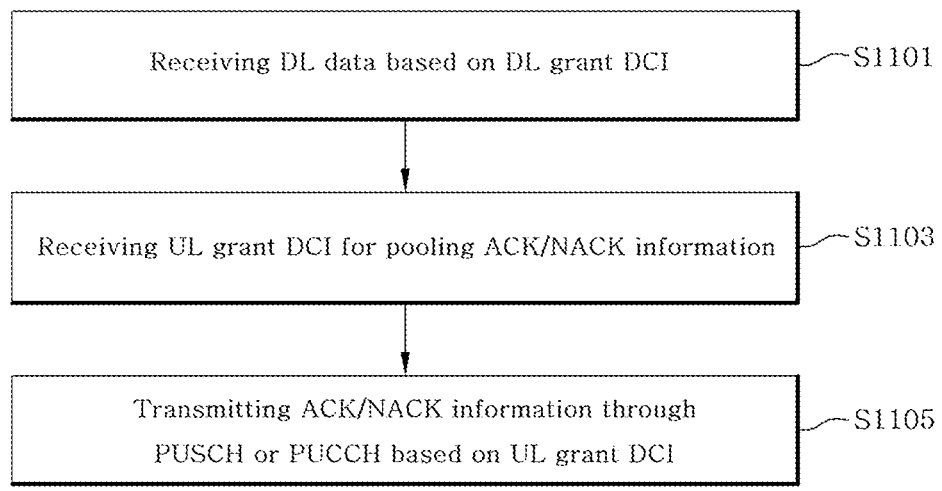

FIG. 12 is a flowchart of a signal reception method according to embodiments of the present disclosure.

Referring to FIG. 12, the embodiments of the present disclosure, which may be performed by a communication device, may include receiving DL data based on DL grant DCI (S1101), receiving UL grant DCI indicating transmission of A/N information for the DL data and a PUCCH resource to be used for the transmission of the A/N information (S1103), and transmitting A/N information for the DL data on the PUSCH without a UL-SCH, based on the UL grant DCI (S1105).

In the case where the UL grant DCI includes PUSCH scheduling, when a PUCCH resource overlaps with a PUSCH resource in the time domain, A/N information may be transmitted on a PUSCH. When the PUCCH resource does not overlap with the PUSCH resource in the time domain, the PUCCH resource and the PUSCH resource may be contiguous in the time domain and located in the same band in the frequency domain. When the UL grant DCI includes PUSCH resource scheduling, the DAI field in the UL grant DCI may include information related to a CC group, an HARQ process ID set related to DL data transmission, and/or a total-DAI, for which an A/N feedback is to be transmitted, instead of serving its original purpose.

When the UL grant DCI does not include PUSCH scheduling, the A/N information may be transmitted in the PUCCH resource. When the UL grant DCI does not include PUSCH scheduling, a field related to UL data transmission in the UL grant DCI may be used for transmission of A/N information for DL data. The field related to UL data transmission is a field used for scheduling UL data by the UL grant DCI. For example, the field related to UL data transmission may be, for example, a field related to an RA, an MCS/TBS, an HARQ process ID related to UL data transmission, and/or an NDI/RV. The field related to UL data transmission may include information related to a CC group, an HARQ process ID set related to DL data transmission, and/or a total-DAI, for which an A/N feedback is to be transmitted, instead of serving its original purpose.

To indicate the absence of PUSCH resource scheduling in UL grant DCI, a method of setting a 1-bit flag of UL grant DCI to one of a first value indicating transmission of A/N information and a second value indicating transmission of a PUSCH, and a method of setting a 1-bit flag of UL grant DCI to one of a first value indicating that a PUSCH does not include a UL-SCH and a second value indicating that the PUSCH includes a UL-SCH (in addition, the UL grant DCI may indicate that there is no CSI request) one of the methods may be used.

In addition to the operation of FIG. 12, one or more of the operations described before with reference to FIGS. 1 to 11 may be performed in combination.

Initial Access and Random Access

Figure 13:
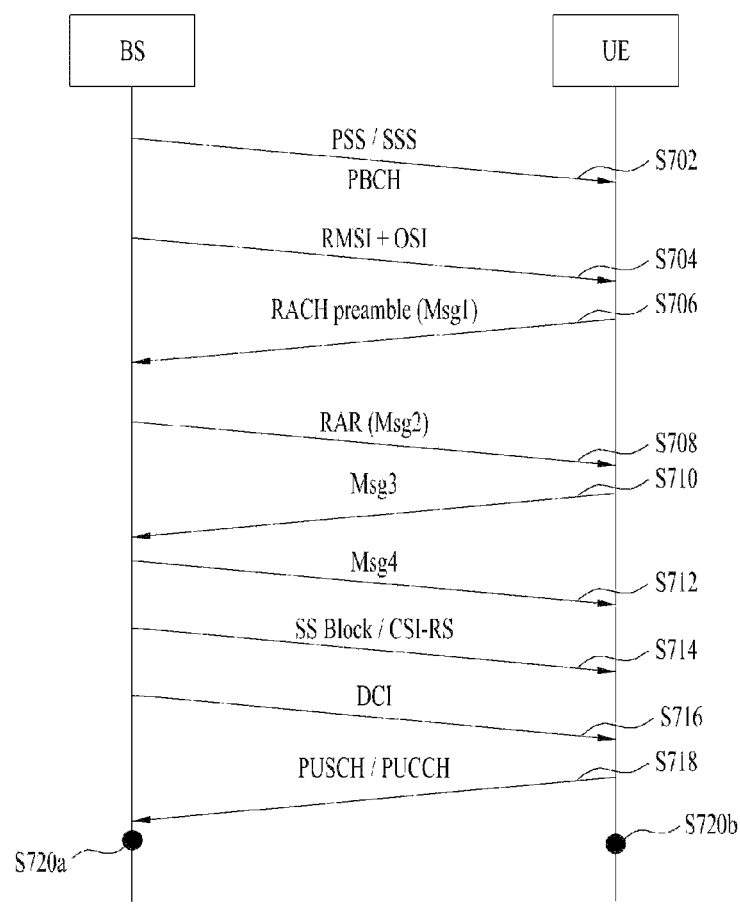

FIG. 13 illustrates an exemplary procedure for network initial access and subsequent communication. In NR, a physical channel and an RS may be transmitted by beamforming. When beamforming-based signal transmission is supported, a beam management process may be performed for beam alignment between a BS and a UE. Further, a signal proposed by the present disclosure may be transmitted/received by beamforming. Beam alignment may be performed based on an SSB in RRC IDLE mode, and based on a CSI-RS (in DL) and an SRS (in UL) in RRC CONNECTED mode. When beamforming-based signal transmission is not supported, a beam-related operation may be skipped in the following description.

Referring to FIG. 13, a BS may transmit an SSB periodically (S702). The SSB includes a PSS/SSS/PBCH. The SSB may be transmitted by beam sweeping. The BS may then transmit remaining minimum system information (RMSI) and other system information (OSI) (S704). The RMSI may include information (e.g., PRACH configuration information) required for the UE to initially access the BS. After the SSB detection, the UE identifies a best SSB. The UE may then transmit an RACH preamble (Message 1 or Msg 1) in PRACH resources linked/corresponding to the index (i.e., beam) of the best SSB (S706). The beam direction of the RACH preamble is associated with the PRACH resources. Association between PRACH resources (and/or RACH preambles) and SSBs (SSB indexes) may be configured by system information (e.g., RMSI). Subsequently, the BS may transmit a random access response (RAR) (Message 2 or Msg 2) in response to the RACH preamble in an RACH procedure (S708). The UE may transmit Message 3 (Msg 3) (e.g., RRC Connection Request) based on a UL grant included in the RAR (S710), and the BS may transmit a contention resolution message (Message 4 or Msg 4) (S712). Msg 4 may include RRC Connection Setup. Msg 1 and Msg 3 may be combined and processed in one step (e.g., Msg A), and Msg 2 and Msg 4 may be combined and processed in one step (e.g., Msg B).

Once an RRC connection is established between the BS and the UE in the RACH procedure, beam alignment may be subsequently performed based on an SSB/CSI-RS (in DL) and an SRS (in UL). For example, the UE may receive the SSB/CSI-RS (S714). The SSB/CSI-RS may be used for the UE to generate a beam/CSI report. The BS may request a beam/CSI report to the UE by DCI (S716). The UE generates the beam/CSI report based on the SSB/CSI-RS and transmit the generated beam/CSI report to the BS on a PUSCH/PUCCH (S718). The beam/CSI report may include information about a preferred beam as a result of beam measurement. The BS and the UE may switch beams based on the beam/CSI report (S720a and S720b).

Subsequently, the UE and the BS may perform the later-described/proposed procedures and/or methods. For example, the UE and the BS may transmit a radio signal by processing information stored in a memory, or process a received radio signal and store the processed radio signal in the memory based on configuration information obtained in the network access procedure (e.g., the system information acquisition process, the RACH-based RRC connection process, and so on) according to a proposal of the present disclosure. The radio signal may include at least one of a PDCCH, a PDSCH, or an RS in DL, and at least one of a PUCCH, a PUSCH, or an SRS in UL.

Msg1 and Msg3 may be transmitted together in the form of MsgA, and MsgB including Msg2 and Msg4 may be transmitted in response to MsgA.

The UE may perform this random access-related operation before the operation described with reference to FIG. 12 (e.g., before step S1101). The UE may receive A/N type information during network access.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
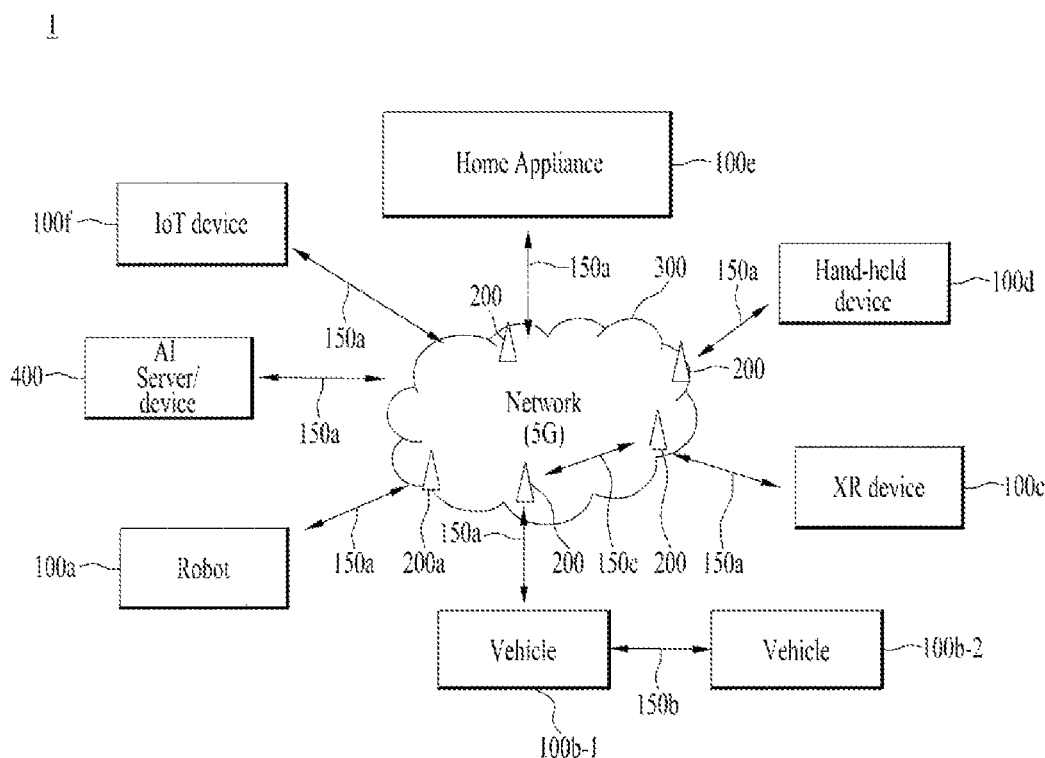
FIGS. 14 to 17 illustrate devices according to an embodiment of the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 15:
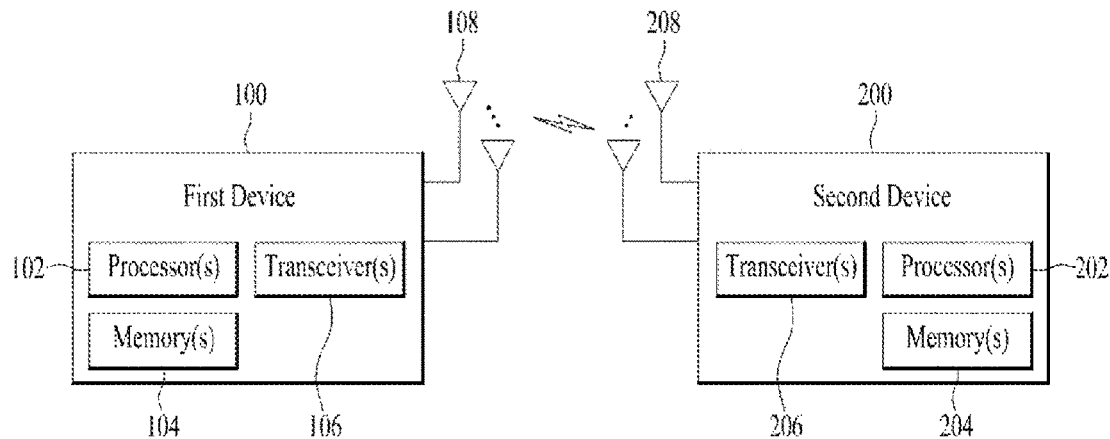

FIG. 15 illustrates wireless devices applicable to the present disclosure.

Referring to FIG. 15, a first wireless device 100 and a second wireless device 200 may transmit wireless signals through a variety of RATs (e.g., LTE and NR). (The first wireless device 100 and the second wireless device 200) may correspond to (the wireless device 100x and the BS 200) and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 16:
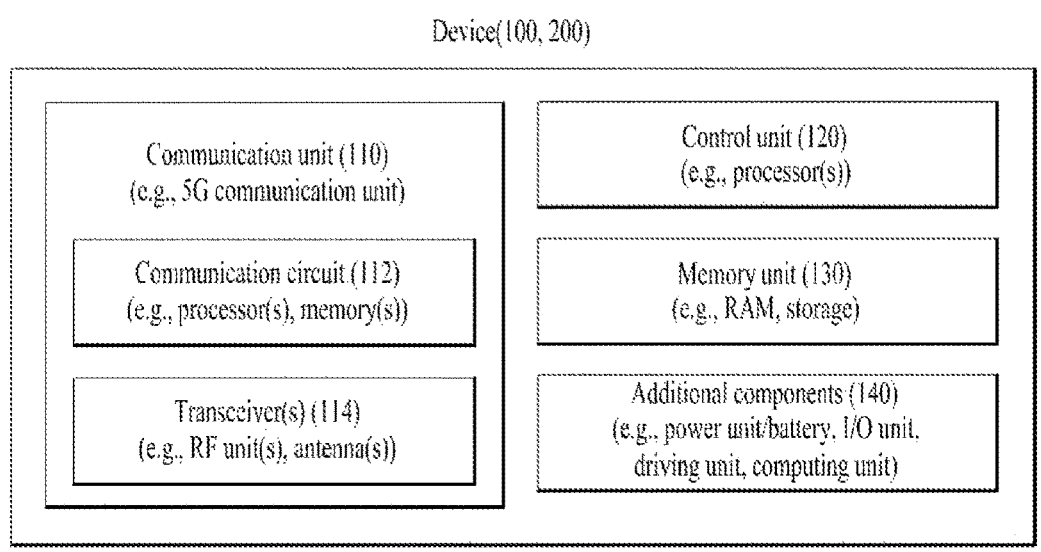

FIG. 16 illustrates another example of a wireless device applied to the present disclosure. The wireless device may be implemented in various forms according to a use case/service (refer to FIG. 14).

Referring to FIG. 16, wireless devices 100 and 200 may correspond to the wireless devices 100 and 200 of FIG. 14 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcasting terminal, a hologram device, a public safety device, an MTC device, a medical device, a FinTech device (or a finance device), a security device, a climate/environment device, the AI server/device (400 of FIG. 14), the BSs (200 of FIG. 14), a network node, or the like. The wireless device may be mobile or fixed according to a use case/service.

In FIG. 16, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 17:
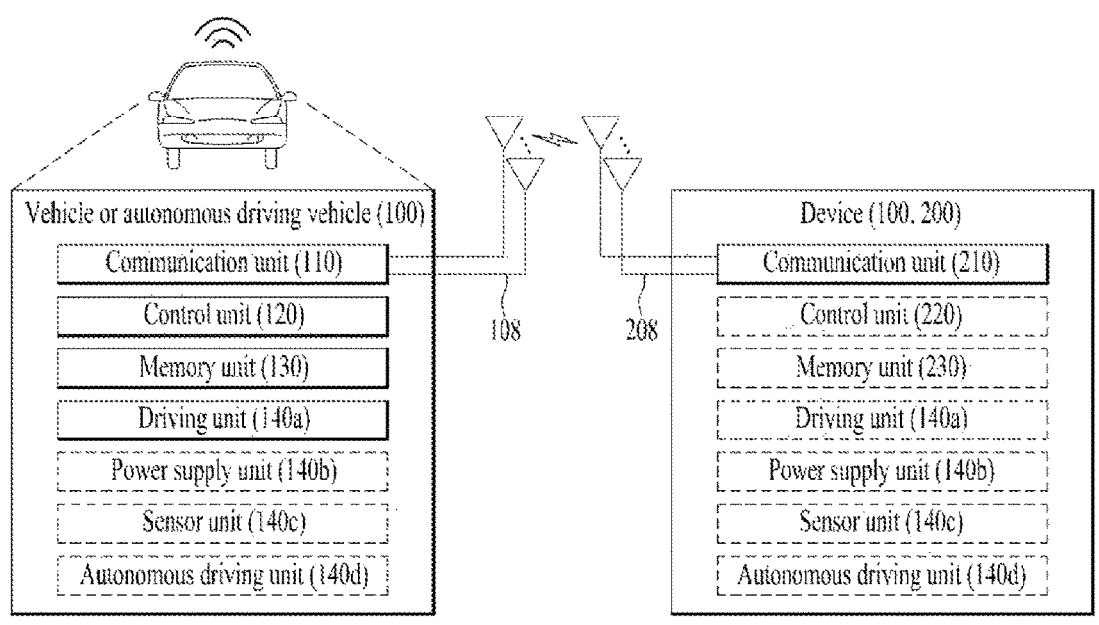

Example of Vehicle or Autonomous Driving Vehicle to which the Present Disclosure is Applied FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

What is claimed is:

1. A method of transmitting and receiving a signal by a communication device in a wireless communication system, the method comprising:
   receiving downlink (DL) data based on first DL grant downlink control information (DCI), wherein the first DL grant DCI includes information regarding transmission timing of acknowledgment/negative acknowledgment (ACK/NACK) information for the DL data; and
   receiving second DL grant DCI,
   wherein, based on the second DL grant DCI, the transmission timing of the ACK/NACK information is configured to be determined based on the second DL grant DCI regardless of the information regarding the transmission timing included in the first DL grant DCI, and
   wherein the second DL grant DCI does not schedule a physical downlink shared channel (PDSCH.

2. The method according to claim 1, wherein, based on a 1-bit flag in the second DL grant DCI, the transmission timing of the ACK/NACK information is configured to be determined based on the second DL grant DCI regardless of the information the transmission timing.

3. The method according to claim 1, wherein, based on a 1-bit flag in the second DL grant DCI being set to a first value, the transmission timing of the ACK/NACK information is configured to be determined based on the second DL grant DCI regardless of the information regarding the transmission timing.

4. The method according to claim 1, wherein, based on a 1-bit flag in the second DL grant DCI being set to a second value, the transmission timing of the ACK/NACK information is configured to be determined based on the information regarding the transmission timing.

5. The method according to claim 1, wherein, based on a 1-bit flag in the second DL grant DCI being set to a first value, whether the ACK/NACK information is transmitted is determined based on a specific field other than the 1-bit flag.

6. A communication device configured to transmit and receive a signal in a wireless communication system, the communication device comprising:
   at least one transceiver;
   at least one processor; and
   at least one memory operatively coupled to the at least one processor and storing instructions which when executed, cause the at least one processor to perform operations comprising:
   receiving downlink (DL) data based on first DL grant downlink control information (DCI), wherein the first DL grant DCI includes information regarding transmission timing of acknowledgment/negative acknowledgment (ACK/NACK) information for the DL data; and
   receiving second DL grant DCI,
   wherein, based on the second DL grant DCI, the transmission timing of the ACK/NACK information is configured to be determined based on the second DL grant DCI regardless of the information regarding the transmission timing included in the first DL grant DCI, and
   wherein the second DL grant DCI does not schedule a physical downlink shared channel (PDSCH.

7. The communication device according to claim 6, wherein, based on a 1-bit flag in the second DL grant DCI, the transmission timing of the ACK/NACK information is configured to be determined based on the second DL grant DCI regardless of the information regarding the transmission timing.

8. The communication device according to claim 6, wherein, based on a 1-bit flag in the second DL grant DCI being set to a first value, the transmission timing of the ACK/NACK information is configured to be determined based on the second DL grant DCI regardless of the information regarding the transmission timing.

9. The communication device according to claim 6, wherein, based on a 1-bit flag in the second DL grant DCI being set to a second value, the transmission timing of the ACK/NACK information is configured to be determined based on the information regarding the transmission timing.

10. The communication device according to claim 6, wherein, based on a 1-bit flag in the second DL grant DCI being set to a first value, whether the ACK/NACK information is transmitted is determined based on a specific field other than the 1-bit flag.

11. The communication device according to claim 6, wherein the communication device includes an autonomous driving vehicle configured to communicate with at least one of a user equipment (UE), a network, another autonomous driving vehicle other than the communication device.

* * * * *